No. 611,905. Patented Oct. 4, 1898.
N. O. HARMAN.
BICYCLE LUGGAGE CARRIER.
(Application filed Aug. 17, 1897.)

(No Model.)

Witnesses

Inventor
Nathaniel O. Harman
By W. W. Dudley & Co
his Attorneys

UNITED STATES PATENT OFFICE.

NATHANIEL O. HARMAN, OF GILBOA, OHIO.

BICYCLE LUGGAGE-CARRIER.

SPECIFICATION forming part of Letters Patent No. 611,905, dated October 4, 1898.

Application filed August 17, 1897. Serial No. 648,510. (No model.)

*To all whom it may concern:*

Be it known that I, NATHANIEL O. HARMAN, a citizen of the United States, residing at Gilboa, in the county of Putnam and State of Ohio, have invented certain new and useful Improvements in Bicycle Luggage-Carriers; and I do declare the following to be a full, clear, and exact description of the invention, such as will enable others skilled in the art to which it appertains to make and use the same, reference being had to the accompanying drawings, and to the letters of reference marked thereon, which form a part of this specification.
This invention relates to luggage-carriers for bicycles and other types of velocipedes, and has for its object the production of a simply-constructed device of this character which is adapted for ready attachment to the bicycle and which is highly efficient for its designed purpose and in no way interferes with the operations of propulsion and steering.

The invention in all its details will be readily understood from a reading of the following description, in connection with the accompanying drawings, in which—

Figure 1:
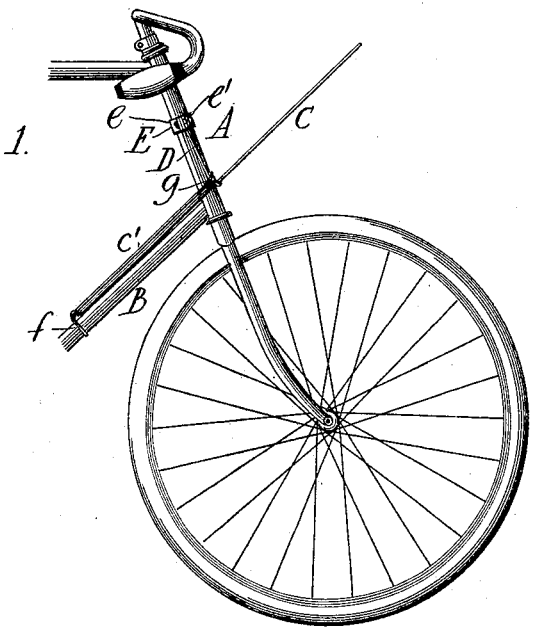
Figure 2:
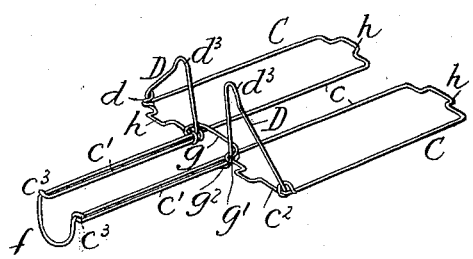
Figure 3:
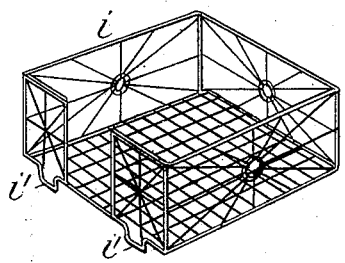

Figure 1 is a side elevation of the front portion of a bicycle with my improved luggage-carrier attached. Fig. 2 is an enlarged perspective view of luggage-carrier detached. Fig. 3 is a perspective view of a basket to be employed in connection with the carrier.

Referring to the said drawings by letter, A denotes the steering-head of a bicycle, and B is the lower frame member.

My improved luggage-carrier is constructed throughout of wire and comprises two frames C C, preferably of rectangular form and which provide the support for the luggage, two brackets D D, which extend upwardly from the rear ends of the frames C, a clip E for securing said brackets to the steering-head, a loop $f$ for engaging the lower frame member, and a hook $g$, adapted to connect the frames forwardly of the steering-head.

In the construction of the carrier a piece of wire is bent to form a frame C, and the inner member $c$ thereof is continued to provide a rearward extension $c'$, which is strengthened by the addition of a second section of wire forming a continuation of the rear frame member $c^2$ and which is above and in contact with the extension $c'$ and is secured thereto by a coil $c^3$. Beyond the coil $c^3$ the wire is bent to form the loop $f$, after which it is carried parallel with the extension $c'$ and frame member $c$ to provide a second extension and frame member and is bent to form the other frame C, and finally is employed to strengthen the second extension $c'$ in a manner similar to that employed in the extension first formed. The brackets D D are each constructed of a single piece of wire and are secured to the rear ends of the frames at or about right angles thereto. In forming the brackets a piece of wire is coiled around the outer rear corner of a frame, as at $d$, and after being bent to the form of an acute angle it is coiled around the rear frame member $c^2$ and the extension $c'$. The upper end of the bracket is slightly contracted to form a loop $d^3$. The hook $g$ is loosely connected at one end to one end of the rear frame members, and its hook portion $g'$ is adapted to engage the inner member of the opposite bracket and is provided with an extension $g^2$, which engages the under side of the adjacent rearward extension, as shown.

Each of the frames C is provided at its ends with loops $h\ h$, which are soldered or otherwise secured thereto, and in practice receive straps by which the luggage is firmly fastened to the carrier. These loops also serve as a means for securing to the carrier a basket $i$, which is preferably of rectangular form and constructed of wire frame with network sides and bottom and which is adapted to be supported by the luggage-carrier frames, loops $i'\ i'$ being provided at the lower ends of the front and rear sides of the basket, which are passed through the loops $h$ and through which is passed a suitable strap to complete the attachment and hold the basket firmly in place on the carrier-frames.

In the attachment of the carrier to a bicycle of the type shown the loop is caused to engage the under side of the lower frame member B, and the extensions and frames are brought into parallelism with said member and the brackets and hook adjacent to the head A. The hook is then fastened to place, and being against the outer side of the head the carrier is prevented from rearward movement. The clip E is adapted to span the head and is provided with securing-bolts $e$ and nuts $e'$, and in completing the attachment the bolts are passed through the ends of the clip and the loops $c^3$ of the brackets, and the nuts being screwed to place it will be found that the carrier is firmly attached in position and is without movement.

When in place, the frames of the carrier and the basket, if attached, extend beyond the head and over the front wheel and provide for the carriage of a considerable amount of baggage, which is at all times within easy reach of the rider. The location of the carrier and its construction and manner of application entirely preclude hindrance to the operations of propelling and steering the bicycle and in no way interfere with mounting and dismounting.

The simple nature of the invention enables it to be cheaply made, and its attachment to a bicycle can be made by unskilled persons. The skeleton formation of the carrier and basket insures lightness and does not mar the appearance of the bicycle. Moreover, the construction is durable and not liable to disorder.

I claim as my invention—

1. A luggage-carrier for bicycles and the like, comprising supporting-frames adapted to extend forward of the steering-head, loops on said frames, rear extensions adapted to extend rearward of said head and terminating in a loop for engaging the lower frame member, brackets extending upward from the inner ends of the frames, and means for securing said frames and brackets to the head, substantially as described.

2. A luggage-carrier for bicycles and the like, comprising supporting-frames adapted to extend forward of the steering-head and in line with the lower frame member, rear extensions adapted to extend rearward of said head and terminating in a loop for engaging the under side of said lower frame member, brackets extending upward from the inner ends of the frames, a hook loosely connected at one end at one side of the carrier and provided at its other end with a double hook for engaging the opposite bracket and rear extension, and a clip for securing the upper ends of the brackets to the steering-head, substantially as described.

3. A luggage-carrier for bicycles and the like, comprising supporting-frames adapted to extend forward of the steering-head, loops on said frames, rear extensions of the frames adapted to extend rearward of said head and to engage the lower frame member, means for securing said frames to the head, and a basket provided with loops for engaging the loops on the frames, substantially as set forth.

In testimony whereof I affix my signature in presence of two witnesses.

NATHANIEL O. HARMAN.

Witnesses:
 LESLIE R. HEWITT,
 H. B. B. MONTGOMERY.